United States Patent [19]

McNeely

[11] 4,302,175
[45] Nov. 24, 1981

[54] APPARATUS FOR MOLDING RECORDED DISCS

[75] Inventor: Michael L. McNeely, Indianapolis, Ind.

[73] Assignee: RCA Corporation, New York, N.Y.

[21] Appl. No.: 163,145

[22] Filed: Jun. 26, 1980

[51] Int. Cl.$^3$ .......................... B29D 17/00; B29C 3/00
[52] U.S. Cl. ................................. 425/385; 425/408; 425/810
[58] Field of Search ............... 425/810, 388, 128, 408, 425/385; 249/102, 103

[56] References Cited

U.S. PATENT DOCUMENTS

| | | | |
|---|---|---|---|
| 1,345,115 | 6/1920 | Aylsworth et al. | 425/470 |
| 3,221,367 | 12/1965 | Cavalier | 425/128 X |
| 3,354,509 | 11/1967 | Ammondson | 249/103 X |
| 3,474,494 | 10/1969 | Damm et al. | 425/388 X |
| 3,945,790 | 3/1976 | Puech | 425/810 |

*Primary Examiner*—J. Howard Flint, Jr.
*Attorney, Agent, or Firm*—Birgit E. Morris; Donald S. Cohen

[57] ABSTRACT

An apparatus for molding recorded discs includes a pair of mold plates having opposed surfaces on which stampers can be mounted. A separate center hold down member fits into an opening in each mold plate to secure the inner edge of the stamper to the mold plate. At least one of the center hold down members has indicia forming means on its surface, either as raised projections or indentations in the surface, to form a desired indicia in the surface of the disc as it is being molded.

7 Claims, 2 Drawing Figures

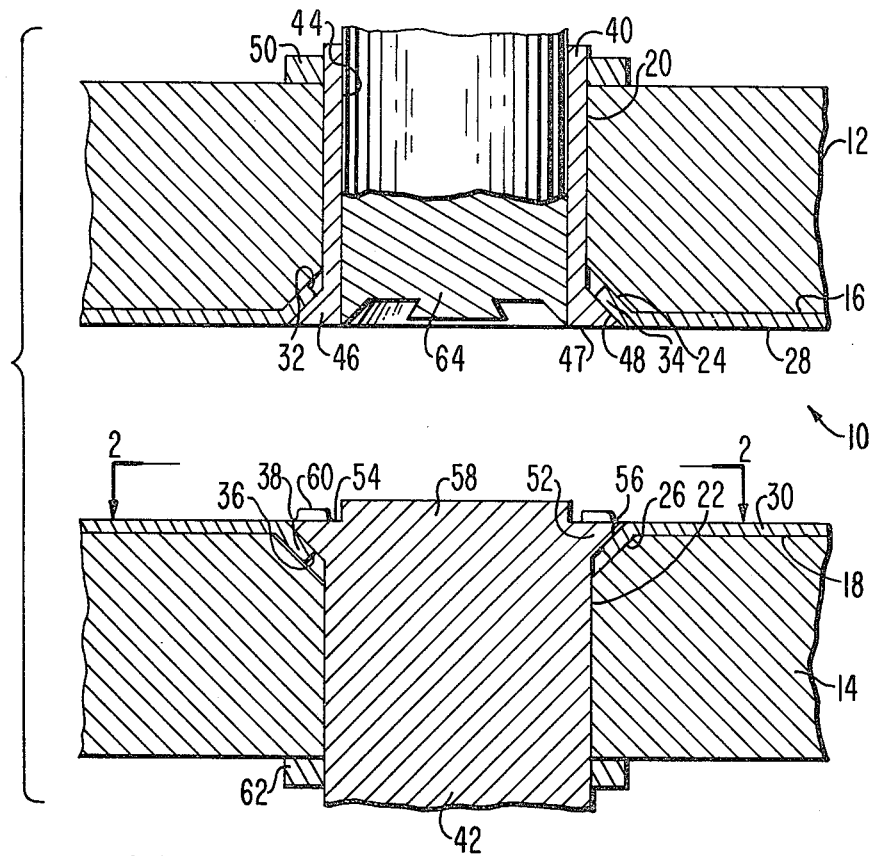
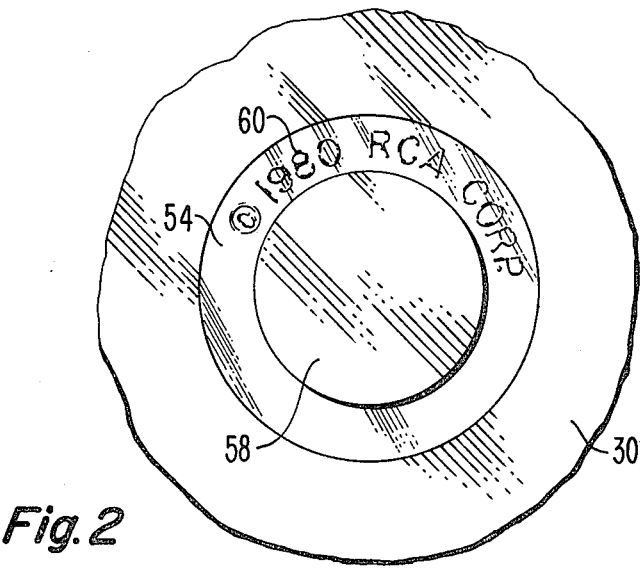

APPARATUS FOR MOLDING RECORDED DISCS

BACKGROUND OF THE INVENTION

The present invention relates to an apparatus for molding recorded discs and particularly to such an apparatus which molds indicia statements on the disc along with the recorded information.

Recorded discs generally comprise a circular, flat plate or disc of a plastic material having a center hole therethrough and recorded information provided therein in the form of a surface relief pattern formed along a spiral path in the major surfaces of the disc. The surface relief pattern preferably may be formed in a spiral groove in the disc. The center portion of the disc is generally left blank and, for audio records, a label is adhered onto the blank center portion which contains information as to what is recorded in the disc and legal information, such as a copyright notice. Recently there has been developed recorded discs, such as video discs, which do not have a label on their center portion but which are placed in a container which has the information thereon. However, for such discs it is still desirable to provide the legal information, such as the copyright notice, directly on the disc.

The recorded discs are generally made in a mold press having a pair of opposed mold plates, at least one of which is movable toward and away from the other, and a stamper on the opposed surfaces of each mold plate. The stampers are thin metal sheets having on one surface thereof indentations or projections which are the negative of the information to be formed on the surface of the disc. Each stamper generally has a central opening therethrough through which a center hold down member extends into an opening in the mold press to secure the inner edge of the stamper to the mold plate. The area of the center hold down member provides the major portion of the blank area of the center of the disc. Because of the manner in which the stampers are made, it is difficult and expensive to provide the stampers with indentations or projections in the form which will form the desired indicia information on the center of the disc.

SUMMARY OF THE INVENTION

The present invention relates to an improvement in an apparatus for molding recorded discs which apparatus includes a pair of opposed mold plates and a center hold down member in each mold plate for securing the center edge of a stamper to the mold plate. The improvement is in providing one of the hold down members with indicia forming means on its surface forming the desired indicia in the recorded disc as the disc is being molded.

BRIEF DESCRIPTION OF THE DRAWINGS

FIG. 1 is a sectional view of a portion of an information disc molding apparatus which incorporates the present invention.

FIG. 2 is a top plan view taken along line 2—2 of FIG. 1.

DETAILED DESCRIPTION

Referring to FIG. 1, there is schematically shown a portion of a record molding press 10. The press 10 includes upper and lower mold plates 12 and 14 which are mounted so that at least one of them is movable toward and away from the other. The mold plates 12 and 14 have opposed surfaces 16 and 18 respectively and aligned center openings 20 and 22 respectively therethrough. The mold plates 12 and 14 have conical recesses 24 and 26 around their respective center openings 20 and 22 at the respective opposed surfaces 16 and 18.

Stampers 28 and 30 are mounted on the opposed surfaces 16 and 18 respectively. The stampers 28 and 30 are thin metal plates having on the surface thereof the negative of the impression to be applied to the surface of the molded record. The upper stamper 28 has a central opening 32 therethrough and a conical portion 34 around the central opening 32. The conical portion 34 fits into the conical recess 24 in the upper mold member 12. The lower stamper 30 also has a center opening 36 therethrough and a conical portion 38 around the central opening 36. The conical portion 38 fits into the conical recess 26 in the lower mold plate 14.

Upper and lower center hold down members 40 and 42 are mounted in the center openings 20 and 22 respectively in the mold plates 12 and 14. The upper center hold down member 40 has a central opening 44 therethrough and a flange 46 extending radially outwardly from its bottom end surface 47. The flange 46 has a conical outer surface 48 so that the flange will fit into the conical recess 24 in the upper mold plate 12. When the upper center hold down member 40 is secured in the opening 20 in the upper mold plate 12, such as by a nut 50 threaded around the upper end of the center hold down member 40, the conical surface 48 of the flange 46 engages the conical portion 34 of the stamper 28 and clamps it against the conical surface of the recess 24 to secure the inner edge of the stamper 28 to the upper mold plate 12.

The lower center hold down member 42 has a flange 52 extending radially outwardly therefrom at its upper end surface 54. The flange 52 has a conical outer surface 56 so that the flange will fit into the conical recess 26 in the lower mold plate 14. A cylindrical hub 58 projects upwardly from the top surface 54 of the lower hold down member 42. The hub 58 is of a diameter equal to the diameter of the opening 44 in the upper hold down member 40 and is in direct alignment with the opening 44. On the upper surface 54 of the lower hold down member 42 around the hub 58 is indicia forming means 60. As shown, the indicia forming means 60 is raised portions in the form of the desired indicia which, as shown in FIG. 2, is a legal copyright notice. However, if desired, the indicia forming means 60 may be depressions in the surface 54 in the form of the desired indicia. When the lower center hold down member 42 is secured in the lower mold plate 14, such as by a nut 62 threaded around the lower end of the lower hold down member 42, the conical surface 56 of the flange 52 is pressed tightly against the conical portion 38 of the lower stamper 30 to secure the inner edge of the stamper 30 to the lower mold plate 14.

A center hole forming pin 64 extends through and is slidable in the opening 44 in the upper center hold down member 40. The center hole forming pin 64 is cylindrical and has an outer diameter corresponding to the desired diameter for the hole to be formed in the recorded disc, e.g., about 1.5 inches (3.8 cm) for a video disc. The details of construction and the operation of the center hole forming pin 64 is described in detail in my copending patent application Ser. No. 93,102, filed Nov. 9, 1979, pending Group 147 entitled "Method And Apparatus For Producing Disc Records Having Molded-In Center Holes".

To make a record in the mold press 10, a preform of the plastic material desired for the record is placed between the mold plates 12 and 14. The preform is generally centered between the hold down members 40 and 42. The mold plates 12 and 14 are heated and are moved together against the preform so as to heat the preform. The mold plates 12 and 14 are moved together until they are spaced apart a distance equal to the desired thickness of the recorded disc being formed. As the mold plates 12 and 14 are moved together against the preform, the plastic of the preform flows radially outwardly and completely fills the space between the stampers 28 and 30. When the mold plates 12 and 14 are moved together to the desired position, the center hole forming pin 64 is moved through the plastic material until it contacts the surface of the hub 58 of the lower hold down member 42 so as to form the hole in the recorded disc. The mold plates 12 and 14 are then cooled so as to harden the plastic material and form the recorded disc. The mold plates 12 and 14 are then separated to permit the removal of the recorded disc.

During the molding of the recorded discs, the plastic material flows around the projections or depressions in the stampers 28 and 30 to form the recorded information in the surfaces of the disc. The plastic material also flows around the indicia forming means 60 to simultaneously mold the indicia directly in the disc at the blank portion of the disc around the hole therethrough. By having the indicia forming means in the surface of the center hold down member, the indicia will be molded in every disc no matter which stampers are used to form the recorded information in the disc. Thus, all the recorded discs molded in the apparatus 10 will be provided with the indicia molded therein without having going to the expense of providing the indicia forming means in all of the stampers used to make the disc. Also, it is easier and less expensive to form the indicia forming means in the center hold down member than in the stampers. Although the indicia forming means has been described as being on the surface of the lower hold down member, the upper hold down member may be provided with indicia forming means on its bottom surface instead of or in addition to the lower hold down member. Thus, the desired indicia can be molded into the record on either or both sides thereof.

I claim:

1. In an apparatus for molding recorded discs which includes a pair of opposed mold plates and a center hold down member in each mold plate for securing the center edge of a stamper to the mold plate, the improvement comprising,
    one of said hold down members having indicia forming means on its surface for forming said indicia in the recorded disc as the disc is being molded.

2. An apparatus in accordance with claim 1 in which the indicia forming means is raised portions on the surface of the hold down member.

3. An apparatus in accordance with claim 1 in which the indicia forming means is depressions in the surface of the hold down member.

4. An apparatus in accordance with claim 1 in which the one hold down member has a cylindrical hub projection from the center of its surface, which hub is smaller in diameter than the surface and the indicia forming means is on the surface around the hub.

5. An apparatus in accordance with claim 4 in which the other hold dowm member has a central opening therethrough of the same diameter and aligned with the hub on the one hold down member, and a center hole forming pin is slidably mounted in the opening in the other hold down member.

6. An apparatus in accordance with claim 5 in which the other hold down member has indicia forming means on its surface around the opening therethrough.

7. An apparatus in accordance with claim 1 in which the one hold down member has a central opening therethrough of a diameter smaller than the diameter of the surface, a center hole forming pin is slidably mounted in said opening and the indicia forming means is on the surface of the hold down member around the opening.

* * * * *

UNITED STATES PATENT AND TRADEMARK OFFICE
CERTIFICATE OF CORRECTION

PATENT NO. : 4,302,175

DATED : November 24, 1981

INVENTOR(S) : Michael Lee McNeely

It is certified that error appears in the above-identified patent and that said Letters Patent is hereby corrected as shown below:

Col. 2, line 67: "Ser. No. 93,102 should be --Ser. No. 93,012--.

Signed and Sealed this

Thirtieth Day of March 1982

[SEAL]

Attest:

Attesting Officer

GERALD J. MOSSINGHOFF

Commissioner of Patents and Trademarks